INVENTORS
VICTOR GERARD
GEORGES PALOMO

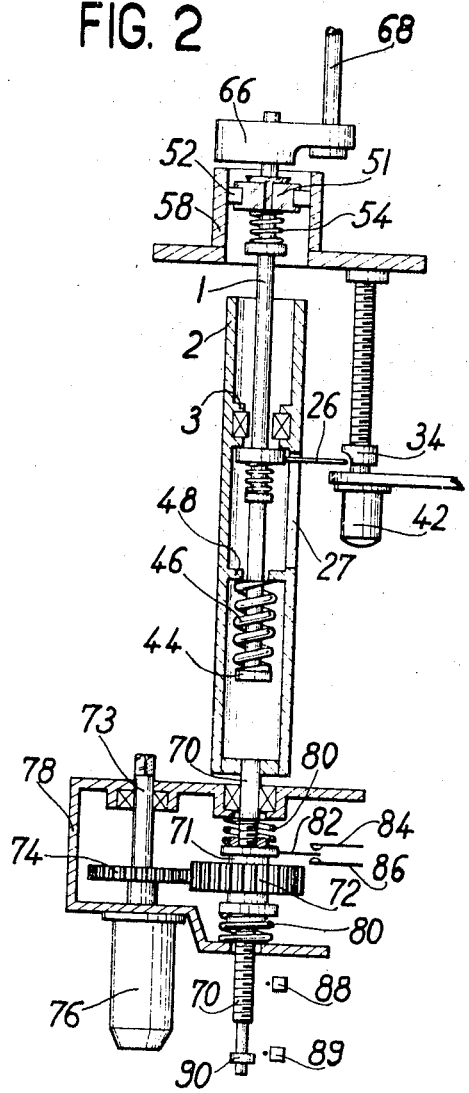

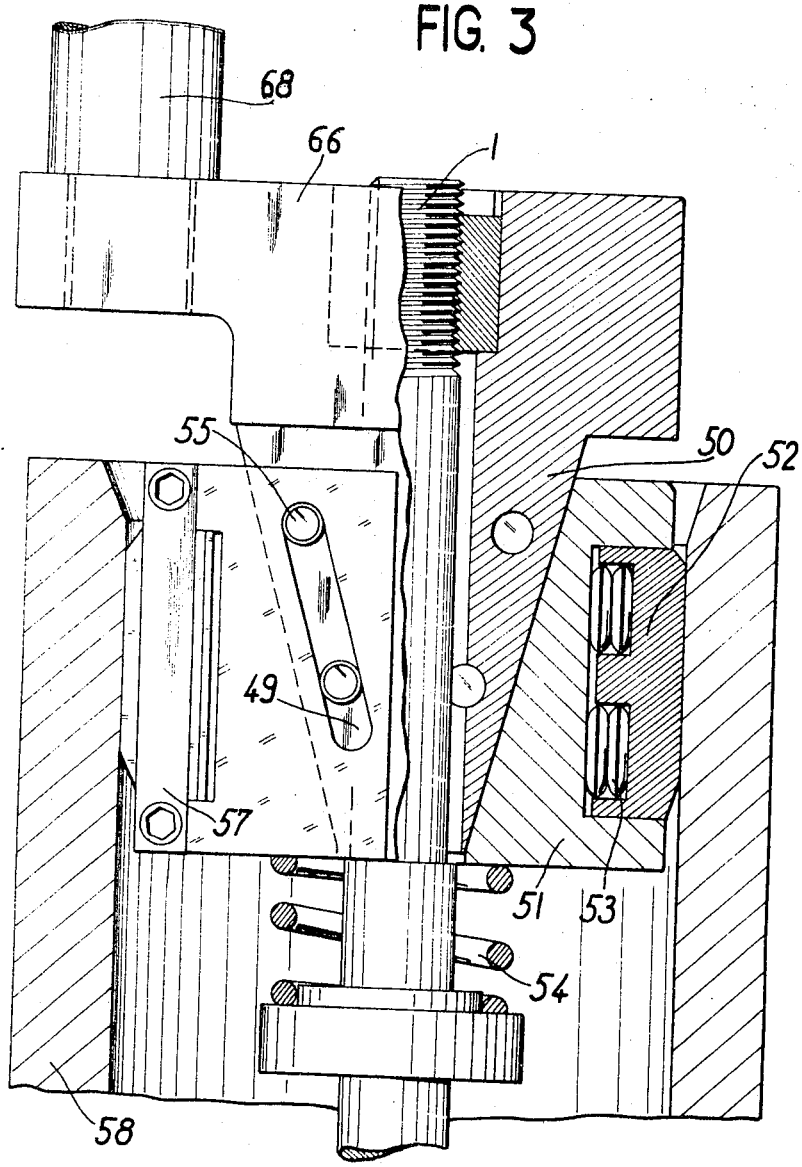

United States Patent Office 3,449,968
Patented June 17, 1969

3,449,968
DRIVE MECHANISM FOR EFFECTING A VERTICAL RECTILINEAL MOVEMENT
Victor Gerard, Cachan, and Georges Palomo, Aix-en-Provence, France, assignors to Commissariat à l'Energie Atomique, Paris, France
Filed Aug. 16, 1966, Ser. No. 572,749
Claims priority, application France, Aug. 26, 1965, 29,584
Int. Cl. F16h 25/12
U.S. Cl. 74—57         8 Claims

ABSTRACT OF THE DISCLOSURE

The drive mechanism is adapted to control movement of small amplitude of an element which must be able to fall very quickly or to be displaced progressively, for example, a control and safety rod of a very small nuclear reactor, said element being fixed on a rod secured by an electromagnet in a guide tube and driven with it in progressive movement. The rod has two collars positioned within the guide tube. The first collar is the armature of the electromagnet and is alternately in abutment on one of two internal shoulders of the guide tube, one of which supports the electromagnet. The second collar, at the end of the rod, supports a spring which pushes the second collar away from the second shoulder and pulls the first collar in abutment on this second shoulder when the electromagnet is deenergized and the rod falls freely in the guide tube.

---

The present invention relates to a drive mechanism for effecting a vertical rectilineal movement and more especially a movement of small amplitude which permits both progressive displacements at a predetermined speed as well as rapid falling movements. The invention has for its object a mechanism of the type comprising a rod to be displaced which is supported within a guide tube by an electromagnet which is rigidly fixed to said guide tube, means for driving said guide tube and said rod in translational motion and a device for rapidly thrusting said rod towards the base of the guide tube as soon as the electromagnet is de-energized.

A mechanism of this type is of particular interest whenever it becomes necessary to vary the position of an element during an operation or even to insert or withdraw said element instantaneously, which is especially the case with the safety elements employed in nuclear reactors. In fact, in nuclear reactors of this type, the neutron flux is regulated by means of control elements such as rods or blocks which are inserted in or withdrawn from the reactor core. Said rods or blocks can be fabricated of neutron-absorbing material, in which case they are inserted into the reactor core at high speed should an emergency arise which necessitates shutdown of the reactor. Alternatively, the control elements referred-to can be fabricated of fissionable material, and in this case they are, on the contrary, withdrawn from the reactor core in order to reduce the rate of reaction to zero.

The mechanism according to the invention can be adapted to two types of operation. It can in fact be placed either underneath or on top of the reactor, depending on the nature of the elements to be actuated.

The mechanism referred-to is characterized in that it comprises within the guide tube a first internal annular shoulder for supporting the electromagnet and a second internal annular shoulder which is spaced from the first at a distance corresponding to the range of motion of the element to be displaced, a ring which is fixed on the rod and either maintained against the electromagnet support shoulder when said electromagnet is energized or in abutment with the second annular shoulder at the end of a free fall of the rod alone, a disc which is parallel to the armature and attached to the rod on the other side of the second annular shoulder, a spring for accelerating the fall of said rod and applied between said disc and said second annular shoulder, said spring having a tendency to hold said disc and said second annular shoulder away from each other as soon as the electromagnet is de-energized, and means for controlling the downward motion and upward return of the guide tube which is coupled with the rod or for controlling the downward motion of the guide tube alone.

A safety plate or rod can thus be inserted or displaced progressively within the reactor core and, in the event of a nuclear excursion, the safety element can be permitted to fall instantaneously into or out of the reactor core. The translational motion of the guide tube is controlled in such a manner that this latter slows down as it draws close to its top position and the braking system additionally serves to prevent any undue velocity of displacement which might otherwise be liable to result in mechanical failure.

A number of other properties and advantages will in any case become apparent from the following description of a drive mechanism in accordance with the invention, said description being given by way of non-limitative example and illustrated in the accompanying drawings, in which:

FIG. 2 represents also in longitudinal cross-section an alternative form of construction of said mechanism as shown in the bottom position;

FIG. 3 shows on a larger scale and in partial cross-section the device for braking the fall of the safety element.

Figure 1:
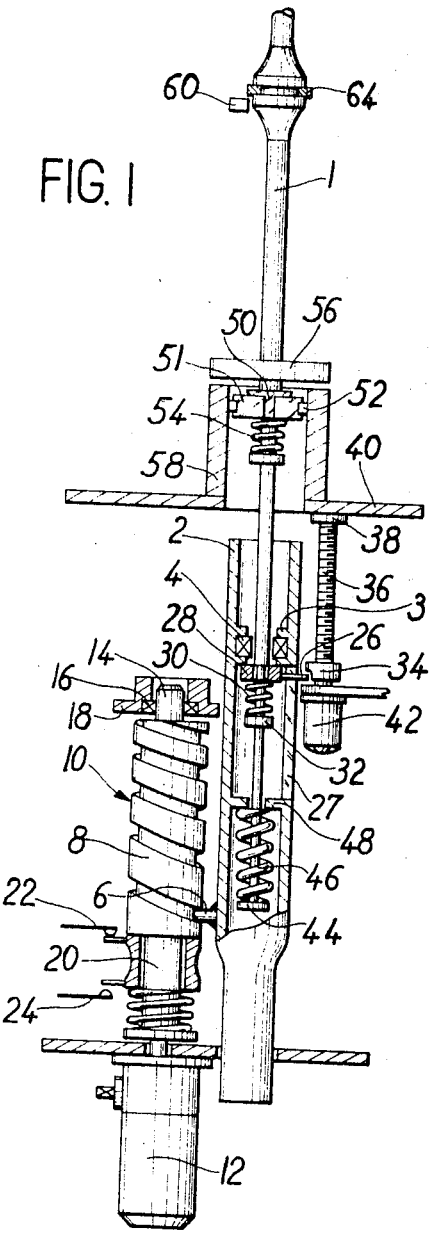
FIG. 1 represents in longitudinal cross-section a mechanism for driving a safety element as shown in the bottom position.

In these two forms of construction, it has been assumed that the safety element was intended to be displaced progressively or withdrawn rapidly, the drive unit being placed at the bottom of the assembly, but it is readily apparent that the invention could also be applied to the reverse operation, that is to say to the rapid insertion from the top of the assembly.

In accordance with one form of construction, the element to be displaced is attached to the top of a rod 1 which is mounted coaxially with a guide tube 2, said guide tube being adapted to support within an internal shouldered section 3 an electromagnet 4 which, when energized, locks said rod 1 within the guide tube and makes said rod fast with said tube in all the displacements of this latter.

The guide tube 2 is provided at its lower end with a stud 6 which is adapted to penetrate into the helical groove 8 of a cam 10 which is driven in rotation by a motor 12 fixed to a support. Said cam 10 has an upward extension in the form of a stub shaft 14 which is supported by a roller bearing 16 and traverses an axial-locking plate 18. Between the motor 12 and the cam 10, an axial stress limiting device 20 is connected to micro-switches 22, 24 which cause the motor to stop when the element to be displaced comes into accidental abutment or reaches the end of its travel.

As shown in FIG. 1, the pitch of the helical groove is smaller in the upper portion of the cam 10, with the result that the movement of the guide tube 2 under the action of said cam 10 is slower when said guide tube is in the vicinity of its top position, that is to say when the safety element is almost completely in position. Conversely, the commencement of the movement of withdrawal is slower than the remainder of the movement.

The position of the safety element which is attached to the rod 1 can also be checked at each instant by means of a fork 26 carried by a ring 28 which is slidably fitted on the rod 1 and maintained against the electromagnet by means of a spring 30 which is applied against a collar 32 forming one piece with said rod 1. The fork 26 traverses a longitudinal slot 27 of the guide tube 2. During the displacements of said guide tube and of the rod 1, said fork exerts a thrust on a nut 34 which moves along a rotary screw 36, said screw being applied at 38 against the frame 40 which supports the complete drive mechanism and thus secured against translational motion. The screw 36 and the nut 34 are also coupled to a device 42 for indicating the position of the nut 34, consequently the position of the rod 1 or, more specifically, of the control element to be displaced (which has not been shown in the drawings).

The rod 1 terminates in a disc 44 on which a compression spring 46 is supported, said spring being applied against an internal annular shoulder 48 of the guide tube 2 and tending to initiate the fall of the rod in opposition to the action produced by the electromagnet 4. As soon as the rod 1 is no longer attracted by the electromagnet, said rod will accordingly be driven by said spring 46 in an extremely rapid downward movement. Dropping of the rod is nevertheless damped by means of a braking system which prevents any sharp impact of the collar 32 against the annular shoulder 48 and comprises (as shown in FIG. 3) a block which is rigidly fixed to the rod 1. Said block forms at the lower end a cone 50 in which are formed elongated openings 49 which are parallel to the inclined faces of the cone 50 and in which studs 55 are adapted to slide, said studs being integral with a slide-block 51. Said slide-block 51 surrounds the cone 50 and carries within two lateral recesses skids 52 which are urged outwards by elastic washers 53. Retaining strips 57 serve to limit the travel of the skids 52. The slide-block 51 is formed in two identical sections which the cone 50 tends to separate and is supported on a spring-acting system 54 which is carried by the rod 1; the complete assembly is placed inside a cylinder 58 which is integral with the frame 40 and against which the skids 52 are thrust by the elastic washers.

At a short distance from the end of travel of the rod 1, the rubbing friction between the cylinder 58 and the skids 52 which are thrust outwards by the elastic washers 53 causes the slide-block 51 to decelerate whilst the cone 50 which accompanies said rod 1 in its movement penetrates between the two sections of the slide-block and separate said sections until the complete assembly is clamped against the cylinder 58.

The top portion 56 of the braking unit can serve as a safety stop by virtue of an annular shoulder which is brought to bear on the top edge of the cylinder 58 in the event of wear of the skids or of dropping of the rod 1 at an excessive speed.

Micro-switches 60, 62 respectively located in the bottom position and top position and operated by a ring 64 which is rigidly fixed to the rod, complete the operational safety arrangements and serve to stop the motor 12 which drives the cam 10.

The mechanism of FIG. 2 is basically of the same design as the mechanism of FIG. 1. A guide tube 2 is fitted with an electromagnet 4 for maintaining a rod 1 securely attached to the lower end of the element to be displaced (which has not been illustrated in the drawings). Said guide tube is coupled to a device for effecting the translational displacement of the guide tube which is accompanied by the displacement of the rod 1 and the insertion or progressive withdrawal of the element. During its movement, the rod 1 displaces a fork 26 which actuates a position indicator 42.

A spring 46 tends at each moment to initiate the dropping of the rod 1 together with the element in opposition to the action produced by the electromagnet, irrespective of the position of the guide tube 2. As the rod falls, the fork 26 which is coupled to the collar 32 through the intermediary of the spring 30 falls together with the rod but without being accompanied in this movement by the nut 34 which falls under the action of its own weight and progressively moves downwards along the rotating screw 36 until the moment when said nut is placed once again in contact with the fork 26.

The same braking system is mounted at the top end of the rod 1. The top portion 66 of the braking unit is attached on the one hand to the extremity of the rod 1 which passes through the central portion thereof and on the other hand to a second rod 68 which is displaced off-center and coupled directly to the element to be displaced.

In this form of construction, the guide tube 2 is provided with an extension at its lower end in the form of a screw 70 which is adapted to move axially inside a nut 71, the central portion of said nut being constituted by a toothed pinion 72 in mesh with a second pinion 74 which is driven in rotation by a reduction-gear motor 76.

The assembly of pinions 72 and 74 is mounted inside a casing 78 which is traversed by the shaft 73 of the pinion 74 and by the screw 70. Springs 80 which are applied on the one hand against the casing 78 and on the other hand against the extremities of the nut 71 respectively form stress-limiting elements whilst a blade 82 which is carried by said nut 71 is adapted to move between two micro-switches 84, 86 which serve to stop the motor 76.

Micro-switches 88, 89 for stopping the same motor in the end position of the guide tube 2 are also actuated by a collar 90 which is carried by the lower end of the screw 70.

The above-described mechanism is particularly well suited to the control of a nuclear reactor safety rod or block of fissionable material such as depleted uranium, for example, which must be withdrawn instantaneously from the reactor in the event of emergency but must be reinserted progressively in order to prevent unduly rapid start-up.

Even in the case of operation by means of a helical cam having a variable pitch, the movement of the guide tube 2 permits the insertion of a safety element both progressively and in such a manner as to ensure deceleration from a predetermined point of its travel so as to permit of accurate positioning.

On the other hand, the falling motion can be instantaneous inasmuch as the action of the spring 46 is added to the combined weight of the assembly so as to accelerate the downward motion.

After dropping of the element, the spring 46 is re-armed by the downward movement of the guide tube 2 which is controlled by the cam 10 or pinion 72. At the end of this downward movement, the shoulder 48 in fact flattens said spring 46 by compression against the disc 44. The electromagnet 4 can then be energized once again and the mechanism is in readiness for moving the rod or block upwards within the reactor.

As will be apparent, a number of different modifications can be made to the mechanism which has just been described by way of example.

For example, the rod 1 could be extended below the disc 44 and coupled at the lower end thereof to an element which is to be inserted rapidly, the mechanism being in that case placed at the top of the assembly. A manual control system for operating the cam 10 or the pinion 74 could also be provided. A number of micro-contact breakers could also be mounted on the mechanism, especially for the purpose of arresting the element in intermediate positions, for the purpose of initiating an emergency shutdown when the element leaves the top position accidentally, for the purpose of signalling the contact between the armature of the electromagnet and the ring 28 or for the purpose of signalling the contact between the fork 26 and the nut 34.

Similarly, the fork 26 could be coupled to the position indicator 42 by means of a rack and pinion system or any other like means.

What we claim is:

1. A drive mechanism for effecting the vertical rectilineal movement of small amplitude of an element which is intended to drop at high velocity or to be displaced progressively, comprising a rod which is rigidly fixed to the element to be displaced, a guide tube placed around said rod and movable in translation, an electro-magnet for interlocking said guide tube with said rod, means for driving the guide tube in vertical translational motion either alone or with the rod, and means for accelerating the fall of the rod within the guide tube, characterized in that said mechanism comprises within the guide tube a first internal annular shoulder supporting the electromagnet and a second internal annular shoulder which is spaced from the first at a distance corresponding to the range of motion of the element to be displaced, a stop ring device fixed on the rod between said first and second shoulders and either maintained against the electromagnet support shoulder when said electromagnet is energized or in abutment with the second annular shoulder at the end of a free fall of the rod alone, a disc which is parallel to the electromagnet and rigidly attached to the rod on the other side of the second annular shoulder, a compressible spring for accelerating the free fall of said rod within said guide tube and applied between said disc and said second annular shoulder, said spring normally being compressed and having a tendency to hold said disc and said shoulder away from each other as soon as the electromagnet is deenergized, said drive means being operably connected with said guide tube for controlling the downward motion and upward return of the guide tube when it is interlocked with the rod and for controlling the downward motion of the guide tube alone.

2. A drive mechanism in accordance with claim 1, characterized in that said drive means comprises a cam for controlling the movement of the guide tube and having an axis parallel to the axis of said guide tube, said cam being provided with a helical groove and secured against translational motion, means for driving said cam in rotation, an external stud integral with the guide tube and engaged in said helical groove so as to be progressively displaced in vertical translational motion as a result of the rotation of said helical groove.

3. A mechanism in accordance with claim 2, characterized in that the helical cam for actuating the guide tube has a progressively variable pitch.

4. A mechanism in accordance with claim 3, characterized in that the helical cam has a smaller pitch at the upper end thereof.

5. A mechanism in accordance with claim 1, characterized in that the guide tube is extended at the lower end by a screw to which is keyed rotationally, a nut forming one piece with an externally toothed pinion which is driven by motor means.

6. A mechanism in accordance with claim 1, characterized in that the top portion of the rod carries a system for braking the fall of said rod.

7. A mechanism in accordance with claim 1 characterized in that the rod is coupled to a fork which is operably connected with a rod position indicator.

8. A mechanism in accordance with claim 7, characterized in that the rod position indicator comprises a nut which is adapted to move along a rotary screw which is coupled to a visual indication device.

References Cited

UNITED STATES PATENTS

| | | | |
|---|---|---|---|
| 2,436,692 | 2/1948 | Greene | 74—57 |
| 2,502,761 | 4/1950 | Stachowiak et al. | 74—57 |
| 2,564,604 | 8/1951 | Jenny | 145—53 |
| 3,302,758 | 2/1967 | Gordon | 188—161 |

FRED C. MATTERN, Jr., *Primary Examiner.*

W. S. RATLIFF, Jr., *Assistant Examiner.*

U.S. Cl. X.R.

188—164